Sept. 27, 1932.   W. HORBATUCK   1,879,251
EASEL
Filed Nov. 16, 1931   3 Sheets-Sheet 1
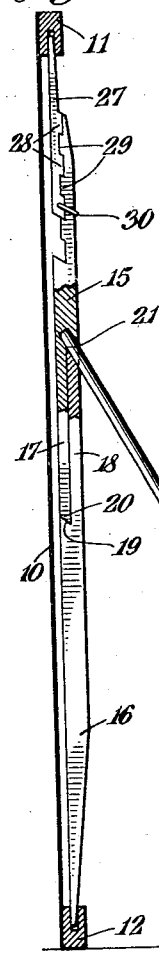
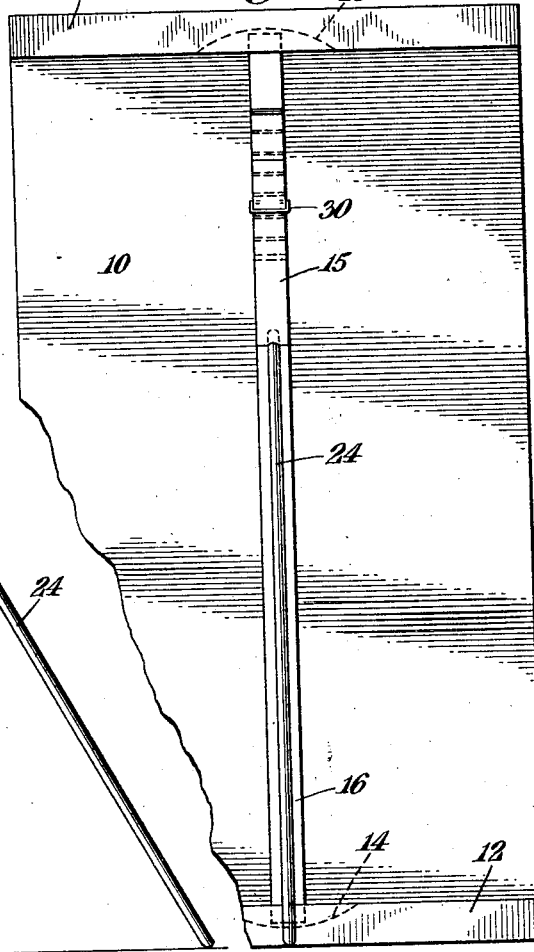
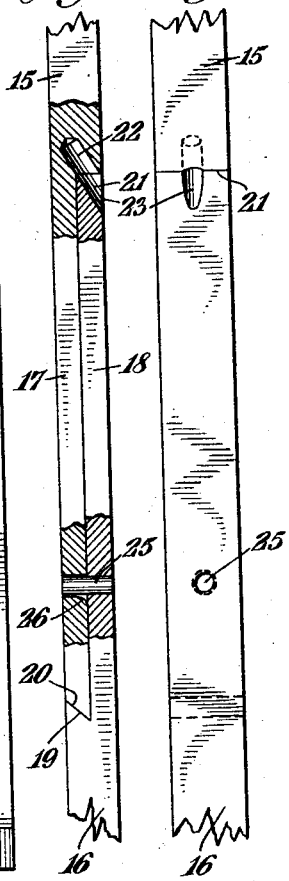
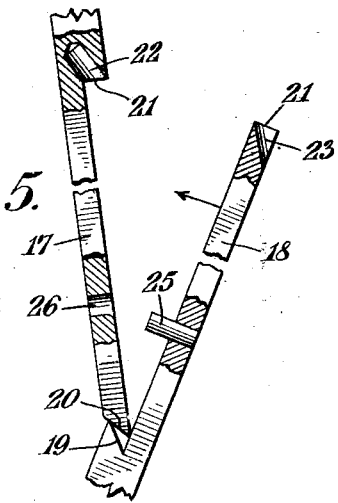
INVENTOR
Wesley Horbatuck.
BY
his ATTORNEY Sept. 27, 1932.    W. HORBATUCK    1,879,251
EASEL
Filed Nov. 16, 1931    3 Sheets-Sheet 2
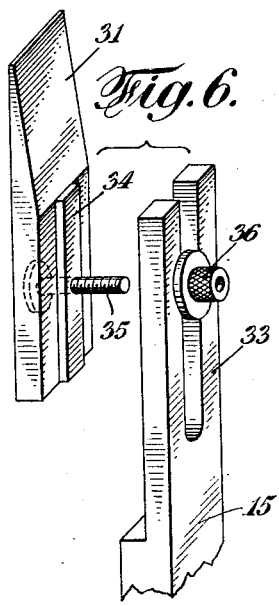
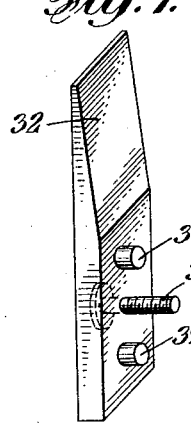
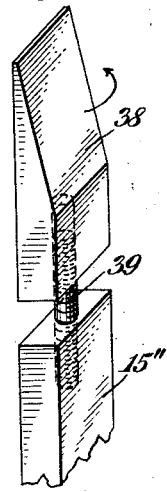
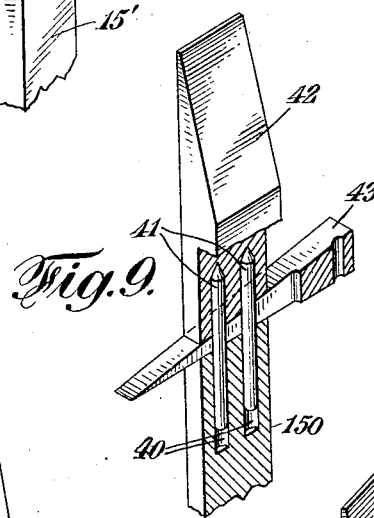
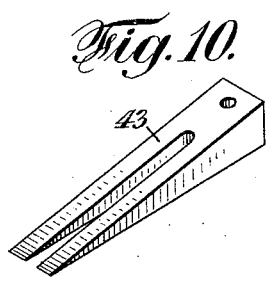
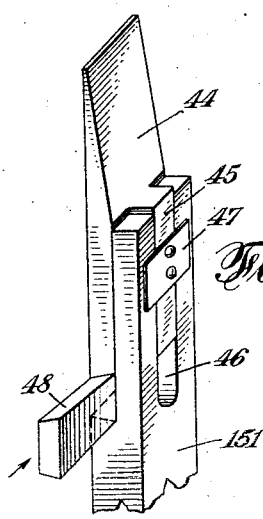
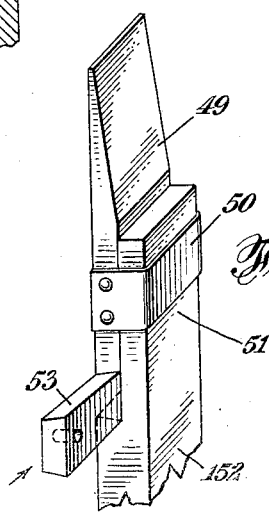
INVENTOR
Wesley Horbatuck.
BY
his ATTORNEY

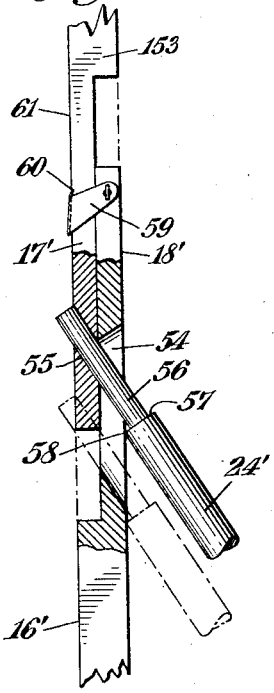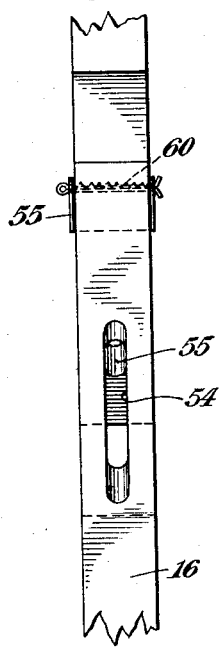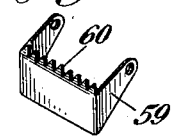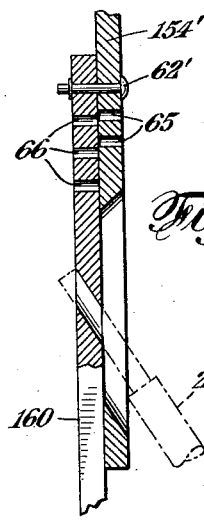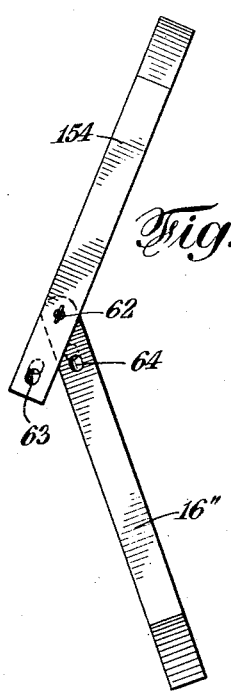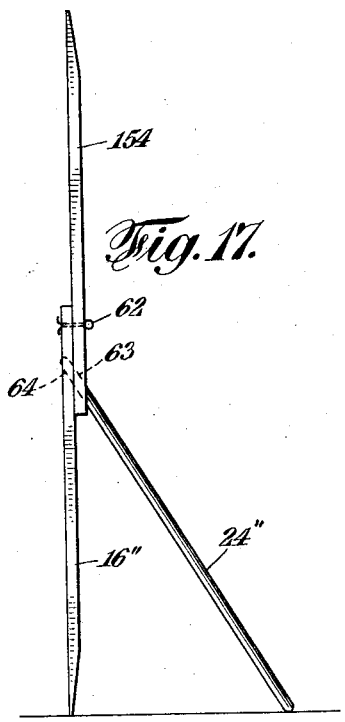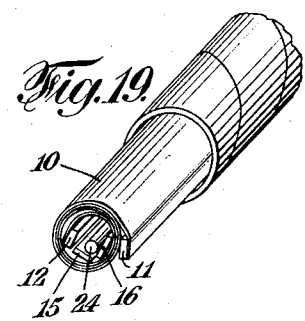

Patented Sept. 27, 1932

1,879,251

UNITED STATES PATENT OFFICE

WESLEY HORBATUCK, OF NEW YORK, N. Y.

EASEL

Application filed November 16, 1931. Serial No. 575,206.

This invention relates to an easel construction, particularly intended for use in connection with printed, lithographed or otherwise processed advertising or display matter or the like, in the shape of relatively thin sheets, which usually are either hung, or rendered self-supporting by mounting them on cardboard, provided with backing and supports in order to permit such display signs to be placed on counters, tables, floors, etc.

The mounting of sheets on supporting cardboard entails considerable labor and other disadvantages, as for instance the bulkiness of the cardboard, in respect to its transportation, its weight and its high cost.

The prime object of the present invention is to provide a very inexpensive, practical backing or support for a relatively thin, limp sheet, which will not only permit a practically instantaneous mounting of such sheet whenever desired, but which will facilitate its shipment, together with the support, in a relatively compact way, while at the same time the weight of the entire article, its size, while being shipped, and its cost are reduced to a minimum, compared with cardboard signs.

Another object of this invention is to provide a collapsible backing means for a sheet consisting of a few inexpensive units, which when assembled are designed to subserve a double function, that of affording a stiff backing under tension for both upper and lower ends of the sheet, and also providing a relatively stable support for its display, irrespective of the nature of the supporting surface.

A still further object of this invention is to so construct the different parts of the support, that the backing or stretching bar, consisting of independent, cooperative units is adapted to be adjusted to the proper tension and length, so as to securely engage and stretch the display sheet, while the brace or stand serves not only as the support for the sheet, but also constitutes an interlocking detent, adapted to restrain the bar members against movement, once they properly engage the sheet.

The foregoing and still further objects will become more fully apparent from the following description and the accompanying drawings, forming part of my disclosure, but by no means intended to limit the same to the actual showing, and in which Fig. 1 is a side elevation of a display sign equipped with my easel arrangement in one of its preferred forms, showing a portion in cross-section.

Fig. 2 is a rear view of a sign provided with my easel arrangement.

Fig. 3 illustrates a side elevation of the connecting portions of the units, forming my backing bar, shown partially in cross-section.

Fig. 4 is a front elevation of such connecting portions of the units.

Fig. 5 illustrates the connecting portions of the units at the moment of their attachment to the sign.

Figs. 6, 7, 8, 9, 10, 11 and 12 illustrate different length adjusting provisions for one of the units of the bar.

Fig. 13 shows a side elevation, partially in cross-section of a modified form of my bar arrangement.

Fig. 14 is a rear elevation thereof.

Fig. 15 illustrates adjusting means for this modified arrangement.

Figs. 16, 17 and 18 illustrate still another modified construction of my easel formation, and Fig. 19 is a partial perspective view, indicating the manner of shipment when the device is collapsed and rolled up in the display sheet within a mailing tube.

Referring now to the drawings, numeral 10 denotes a sign in the form of a printed sheet, at the upper and lower end of which are provided bars 11 and 12. At about the centre, each bar possesses a recess, indicated at 13 and 14, facing one another, adapted to receive the ends of the stretching or backing bar consisting of an upper unit 15 and a lower unit 16 in interlocking engagement with one another.

Upper unit 15 is shown to consist of two parts. However, it may be constructed from one member only, as is the case with the lower unit 16. On the other hand, lower unit 16 may be equipped with adjusting provisions similar to those shown in connection with unit 15.

The connecting portions of the units are reduced as indicated at 17 and 18 and the lower engaging end of unit 16 is undercut, as indicated at 19, while the lower engaging end of reduced portion 17 is beveled, as shown at 20. The upper connecting ends of the reduced portions are preferably straight, as seen at 21.

At the connecting portion there is provided in the upper unit 15 a socket 22, which forms a continuation of a drill hole 23, formed at the upper end of the reduced portion 18. This drill hole 23 constitutes a recess and is adapted to engage a portion of the upper end of brace or stand 24, which is forced into socket 22. This connection between the two units through brace 24 forms a lock between them, preventing their disconnection from one another, and at the same time arresting their sidewise movement.

In order to prevent the lower interlocking ends of the reduced portions 17 and 18 from moving sidewise, I preferably provide a pin 25, which is fixedly associated with one of the reduced portions, in this case portion 18, while a corresponding aperture 26 is provided in the other reduced portion 17 for accommodating pin 25, when the portions are brought into interlocking relation with one another.

Due to slight inaccuracies often occurring in the course of manufacturing the sheet, and in the attachment of bars 11 and 12 to the latter, there might arise from time to time the necessity of adjusting the length of the backing bar, so as to properly stretch the sheet. For this purpose I have provided adjusting means, forming either a separate item connected with one of the units, or I have so arranged the easel units, that the latter may be set directly to various length dimensions.

In Figures 1 and 2 there is illustrated an arrangement with the upper unit 15, which consists of an auxiliary member 27 provided with teeth 28, while the upper end of unit 15 is provided with corresponding teeth 29, which interlock with teeth 28. A loop 30 holds the auxiliary member 27 in proper relation to unit 15, after their desired adjustment is made.

In Figures 6 and 7 there are provided auxiliary slides 31 and 32 adapted to engage a corresponding, fork-like structure 33 at the end of unit 15'. For guiding member 31 there is provided a bead 34, through the centre of which passes a clamping screw 35, adapted to be engaged by nut 36, shown at the outer surface of fork-like arrangement 33. In Figure 7, for bead 34 are substituted dowel pins 37; otherwise its construction and operation in fork arrangement 33 remains the same.

In Figure 8 there is illustrated upper unit 15" with an adjustable extension 38, connected with the former by means of a screw 39. By turning extension 38 in either left hand or right hand directions, the length of unit 15 is increased or decreased, respectively.

Figure 9 and 10 show another modification of adjustment, where a unit 150 is shown provided with sockets or holes 40 for receiving pins 41, secured in the auxiliary end 42 of the unit. A fork-like wedge 43 thrust between extension 42 and unit 150 permits adjustment of the length of the unit. Somewhat similar arrangements are illustrated in Figures 11 and 12.

In Figure 11, an auxiliary extension 44 is shown, provided with a guide ridge 45 adapted to operate within a slot 46 and held in connection with unit 151 by means of a guide plate 47. A wedge 48 engaging with its beveled sides correspondingly beveled edges of the extension and of the unit affords adjustment of the extension, and thereby the lengthening or shortening of the unit.

In Figure 12 an auxiliary extension 49 is shown, secured by means of strip 50 to the reduced end 51 of unit 152. By means of wedge 53, having beveled edges, and engaging the beveled edges of extension 49 and unit 152, the length of the unit is again made adjustable.

A modified bar arrangement is illustrated in Figures 13, 14 and 15, where the reduced connecting portions of the two units are shown to have straight end edges. The lower unit 16' is provided at its reduced portion 18' with a slot 54, while in the reduced portion 17' of upper unit 153 is an aperture 55, adapted to accommodate the extreme end portion of reduced end 56 of brace 24', while the immediately adjacent reduced end portion projects through slot 54 of unit 16'. Through the reduction of the end of brace 24', there is created a step 57, the edge of which engages at 58 the outer surface of reduced portion 18', and so to speak, wedges itself against that part of the bar.

At the upper end of reduced portion 18' there is hingedly associated a yoke 59, provided at its upper edge with serrations or teeth 60, adapted to engage the outer surface 61 of reduced portion 17', for the purpose of adjusting it relative to portion 18'.

It will be observed that both reduced portions terminate in straight abutting edges and that therefore the adjustment of the two elements relative to one another may be readily accomplished. Yoke 59 on one hand, and the arrangement of the reduced end of brace 24' on the other hand, keep the two units in their respective adjacent relation to one another so that they form a stiff, adjustable backing for the display sheet. It is obvious that not a very extensive adjustment is required for the backing bar, which is indicated by the dotted line position of both the brace and the bar units in Figure 13.

Still another modified form of my easel arrangement is illustrated in Figures 16 and 17, in which I employ an upper bar unit 154 and a lower bar unit 16″, hingedly connected with one another at 62, and both provided with brace receiving apertures 63 and 64, respectively, adapted to register with one another when the bar is in the position shown in Figure 17. Ordinarily the hinge connection between the two units in this construction will suffice for properly stretching the sheet. When however, a further adjustment should be required, I may adapt the modified form, (illustrated in Figure 18) of connecting the two units together, employing a principle similar to that explained in connection with Figures 13, 14 and 15. In this modification, bars 154′ and 160 are hingedly connected at 62′. However, there are provided additional apertures 65 and 66 for allowing the shifting of the hinge pin to different positions. In order to facilitate such adjustment, one of the bar units is provided with a slanting hole, while the other bar unit is equipped with a slot, so as to permit the positioning of the brace, indicated at 24″, relative to the bar units. In all construction shown however, braces 24, 24′ and 24″ function as the locking, connecting and position fixing element, intended for preventing sidewise movement of the bar units, once they are in adjusted position.

All of the designs illustrated clearly indicate that various modifications and improvements may be readily made in the present invention, and although I have only shown specific modifications thereof, be it understood that additional improvements and changes may be incorporated in my idea, and I therefore reserve for myself the right to make such changes and improvements within the broad scope of my invention, as covered by the annexed claims.

I claim:

1. In an easel construction for the purpose described, including a two-unit sheet stretching member and a brace, a locking arrangement for said member and brace, comprising in combination reduced unit engaging portions, one of the latter having a recess formation at about the point where its reduction commences, the end of the other reduced unit portion having provisions for lockably engaging said recess formation, one of the portions having a brace-receiving means, the other having brace engaging guide means adapted to form a continuation of said brace-receiving means, when the reduced unit portions are in operative interengagement, said brace engaging said receiving means and said guide means and forming a lock for and preventing a sidewise movement of said two-unit stretching member in its operative position.

2. A collapsible easel arrangement for flexible posters or the like, provided with a pair of substantially parallel bars, comprising a poster stretching member, adapted to engage said bars, consisting of two independent, but separable units, provided with abutting, interlockable, reduced portions, forming a joint and an independent brace member, the latter adapted to substantially penetrate said units at their interlocking joint, thereby holding them in fixed position.

3. A collapsible easel arrangement for flexible posters or the like, provided with a pair of substantially parallel bars, comprising a poster stretching member, adapted to engage said bars, consisting of two independent, interlockable, but separable units having reduced, abutting engaging portions, and an independent brace member adapted to engage one end of said engaging portions, thereby holding the units in fixed position.

4. In a collapsible easel arrangement, the combination with a flexible poster or the like, provided with a pair of substantially parallel bars, of a poster stretching member, adapted to engage said bars, consisting of two independent units having reduced engaging portions, the end of the reduced engaging portion of one unit adapted to interlock with the other unit, the end of the reduced engaging portion of the latter unit adapted to register with the first unit, a brace member, independent of both units, adapted to engage the reduced portion of the other unit and to project into the first unit, thereby holding the units in fixed, locked position against a sidewise movement.

5. The combination with a flexible poster or the like, provided with a pair of substantially parallel bars, of a collapsible easel arrangement comprising a poster stretching member and a brace member, the former consisting of two independent units having reduced, abutting and interengaging portions, the portion of one unit adapted to interlock with the other unit, while the portion of the other unit registers with that one unit, said brace member adapted to engage the registering parts of said units, thereby locking them in position.

6. The combination with a flexible poster or the like, provided with a pair of substantially parallel bars, of a collapsible easel arrangement comprising a poster stretching member and a brace member, the former consisting of two independent units having reduced interengaging portions, the reduced end of one unit adapted to interlock with the other unit, while the reduced end of the other unit registers with the stepped down portion of that one unit, said brace member adapted to engage the registering parts of said units, thereby locking them in position, one of said units provided with means for adjusting the length of said stretching member.

7. The combination with a flexible poster, having parallel bars, of a collapsible easel comprising a bar engaging stretching member and a brace member, the former composed of two units having reduced interengaging portions, the end of the reduced portion of one unit adapted to interlock with the other unit, and further adapted to facilitate the abutting of the reduced unit portions against each other, the end of the reduced portion of the other unit adapted to register with the first unit, and provided with a brace engaging recess, said first unit having a brace engaging socket in register with said recess, said brace adapted to pass through said recess into said socket and hold said units in locked position against a sidewise movement.

In testimony whereof he affixes his signature.

WESLEY HORBATUCK.